United States Patent [19]

McIntyre et al.

[11] Patent Number: 4,534,845

[45] Date of Patent: Aug. 13, 1985

[54] SEPARATOR-GAS ELECTRODE COMBINATION

[75] Inventors: James A. McIntyre; Robert F. Phillips, both of Midland, Mich.

[73] Assignee: The Dow Chemical Company, Midland, Mich.

[21] Appl. No.: 637,456

[22] Filed: Aug. 3, 1984

Related U.S. Application Data

[63] Continuation of Ser. No. 404,690, Aug. 3, 1982, abandoned.

[51] Int. Cl.³ .............................................. C25B 1/46
[52] U.S. Cl. .................................. 204/283; 204/98; 204/128; 204/265; 204/266
[58] Field of Search ................. 204/98, 128, 265, 266, 204/283

[56] References Cited

U.S. PATENT DOCUMENTS

| | | | |
|---|---|---|---|
| 3,017,338 | 1/1962 | Butler, Jr. et al. | 204/98 |
| 3,300,398 | 1/1967 | Sprague | 204/101 |
| 3,926,769 | 12/1975 | Gritzner | 204/265 |
| 4,040,938 | 8/1977 | Robertson | 204/283 |
| 4,066,519 | 1/1978 | Kadija et al. | 204/98 |
| 4,140,615 | 2/1979 | Kadija et al. | 204/283 |
| 4,312,720 | 1/1982 | Lefevre | 204/265 |
| 4,332,662 | 6/1982 | Pouli et al. | 204/266 |

*Primary Examiner*—Howard S. Williams
*Assistant Examiner*—Terryence Chapman
*Attorney, Agent, or Firm*—James H. Dickerson

[57] ABSTRACT

The invention is a separator-gas electrode combination comprising a separator having a first and a second face adapted to permit the flow of fluids or ions therethrough; a gas electrode adapted to permit a liquid and a gas to enter and exit the electrode and having at least a first and a second face; and a non-conductive self-draining member having a fluid outlet. The self-draining member has at least two faces; at least a portion of a first face contiguous to at least a portion of one face of the separator and at least a portion of a second face contiguous to at least a portion of one face of the gas electrode. The self-draining member has a plurality of interconnected passageways which are in fluid transferring communication with the separator, the gas electrode, and the fluid outlet and provide the major conduit therebetween.

13 Claims, 3 Drawing Figures

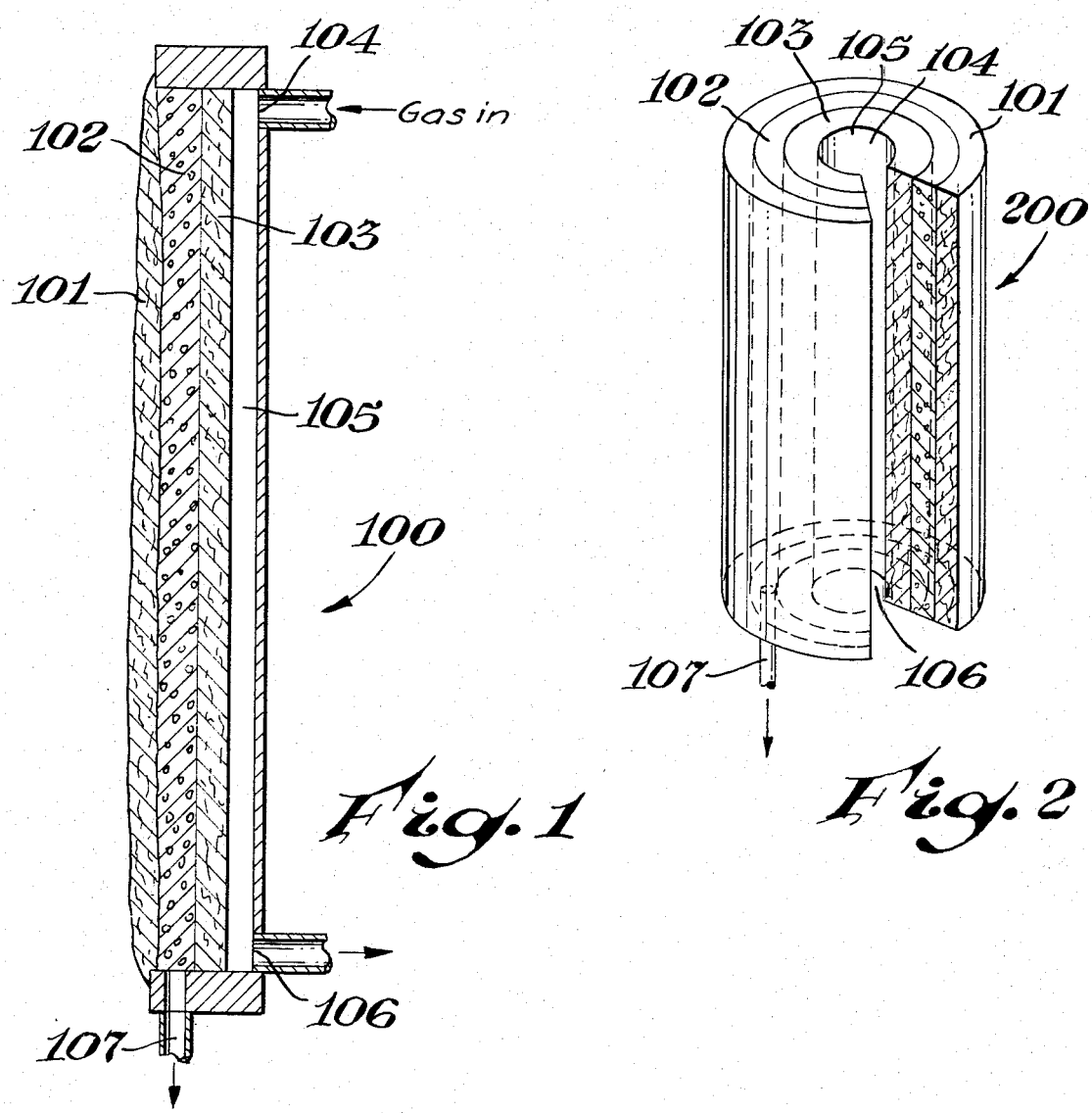
Fig. 1
Fig. 2
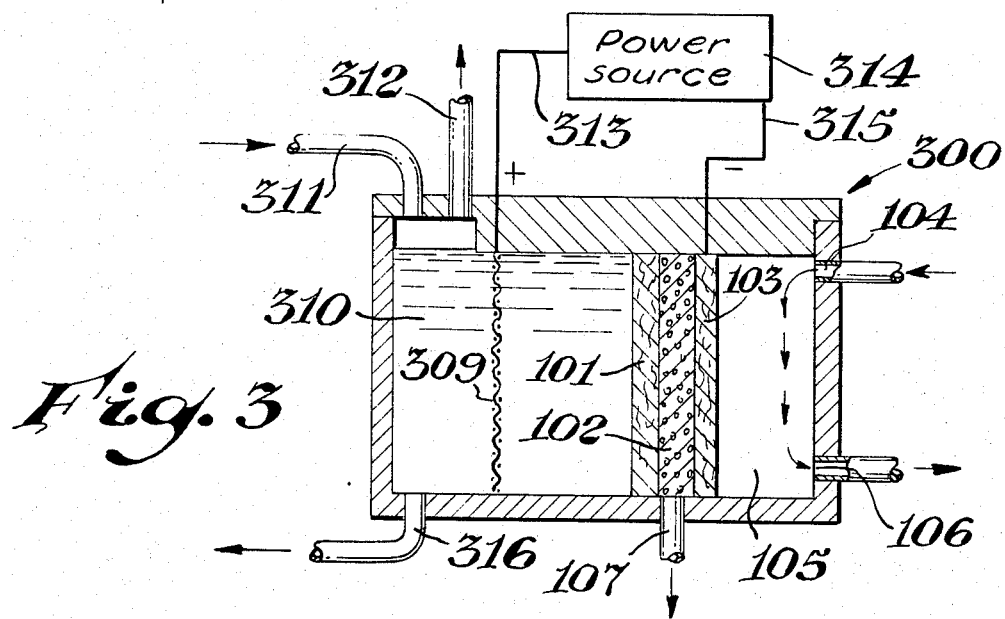
Fig. 3

SEPARATOR-GAS ELECTRODE COMBINATION

This application is a continuation of Ser. No. 404,690, filed 8-3-82, now abandoned.

BACKGROUND OF THE INVENTION

This invention relates to electrolytic cells, and particularly to electrolytic cells having a separator and a gas electrode.

Most electrolytic cells have two electrodes spaced apart by a separator. The separator is a member designed to impede the flow of liquids between the two electrodes. Separators are often composed of a mat of fibrous material or an ion exchange membrane sheet supported by a screen-like support member. It is important that the separator be held firmly in place to minimize excessive flexing, which causes cracks or breaks in the separator and defeats its purpose. Corrosion problems make it difficult to supply a support member that will provide the necessary rigidity over a long period of time.

To provide the necessary rigidity, it would be desirable to support the separator on an electrode. However, it is impossible to support separators on some recently-developed gas electrodes of the type described in U.S. Pat. Nos. 4,179,350; 4,187,350; 4,197,367; 4,213,833; 4,256,545; 4,260,469; and 4,269,691.

These gas electrodes have a plurality of passageways traversing the electrode which provide a pathway for liquids and gases to enter and exit the electrode. In the operation of these electrodes, a gas-liquid interface is formed by flowing a gas reactant into the passageways from one face of the electrode and flowing a liquid reactant into the passageways from another face of the electrode. Electrochemical reactions are caused to occur at this interface to produce a nonvolatile product.

If the separator were supported on a face of this type electrode, there would be no suitable exit from the electrode for the nonvolatile product. The only possible exits would be:

(1) through the gas side of the electrode; which would prevent additional gas from entering and cause the electrochemical reactions to cease; or (2) through the separator and back into the adjoining electrode chamber where the product might be reconverted into reactants.

It would be desirable to rigidly support a separator on this type of gas electrode to minimize flexing while simultaneously providing a pathway for the removal of nonvolatile products.

SUMMARY OF THE INVENTION

The invention provides a simple method whereby a separator may be rigidly supported on a gas electrode of the type described above. The invention is separator-gas electrode combination which comprises (a) a separator adapted to permit the flow of fluids or ions therethrough and having at least a first and a second face; and (b) a hydraulically permeable gas electrode adapted to permit a liquid and a gas to enter and exit and having at least a first face and a second face; and (c) an electrically non-conductive self-draining member having a fluid outlet and at least two faces. At least a portion of a first face of the self-draining member is contiguous to at least a portion of one face of the separator and at least a portion of a second face of the self-draining member is contiguous to at least a portion of one face of the gas electrode. The self-draining member has a plurality of interconnected passageways which are in fluid-transferring communication with the separator, the gas electrode, and the fluid outlet and provide the major conduit therebetween.

BRIEF DESCRIPTION OF THE DRAWING

FIG. 1 illustrates one embodiment of the invention. It shows a separator-gas electrode combination which is planar.

FIG. 2 illustrates another embodiment of the invention. It shows a cylindrical shaped separator-gas electrode combination.

FIG. 3 illustrates the separator-gas electrode combination in an electrochemical cell.

DETAILED DESCRIPTION OF THE DRAWING

FIG. 1 shows the separator-gas electrode combination 100. The combination comprises a separator 101, a gas electrode 103, and a self-draining member 102 which has a fluid outlet 107. One face of the self-draining member 102 is contiguous to at least a portion of one face of the separator 101 and a second face of the self-draining member is contiguous to at least a portion of one face of the gas electrode 103. A second face of the gas electrode is contiguous to a gas chamber 105 which has a gas inlet port 104 and an optional gas outlet port 106.

In FIG. 2, the separator-gas electrode combination 200 is illustrated in a cylindrical shape. The combination comprises a separator 101 and a self-draining member 102 having a fluid outlet 107. A first face of the self-draining member is contiguous to at least a portion of one face of the separator 101. A second face of the self-draining member 102 is contiguous to at least a portion of one face of a gas electrode 103. The gas electrode 103 encloses a gas chamber 105 which has a gas inlet port 104 and an optional gas outlet port 106.

FIG. 3 illustrates the separator-electrode combination in place in an electrochemical cell 300. The cell comprises an anode 309 in an anode chamber 310. The anode chamber has an inlet port through conduit 311 and an outlet port through conduit 316. Conduit 312 provides another outlet port from the anode chamber 310. The separator-gas electrode combination comprises a separator 101, a gas electrode 103 and a self-draining member 102, which has a fluid outlet 107. Contiguous to one face of the gas electrode 103 is a gas chamber 105. The chamber has a gas inlet port 104 and an optional gas outlet port 106. Electrical power is supplied to the anode and the cathode by power source 314 through electrical leads 313 and 315.

The separator 101 (FIGS. 1–3) is a diaphragm or an ion exchange membrane.

A diaphragm is a hydraulically permeable separator most commonly composed of asbestos fibers, although many other materials may be used, such as: (1) mixtures of fibrous asbestos and polytetrafluoroethylene (sold under the trade name "Teflon"); (2) fibers of other polymers; and (3) fibrous copolymers of fluorinated ethylenes, propylenes, and the like. The diaphragm must be thin enough to be substantially permeable to liquid flow and should not become easily plugged. Conversely, it should be thick enough to hold well to the self-draining member and not rupture or have large openings. Suitable asbestos diaphragm thicknesses have been found to be from about 0.06 of an inch to about 0.25 of an inch for most applications.

Optionally, the separator may be a substantially completely hydraulically impermeable ion exchange membrane. Membranes are usually comprised of a sheet of resinous material which contains fixed anion or cation exchange groups that permit intrusion and exchange of some ions, while excluding other ions. Commonly used cation selective membranes comprise polymers having one or more negatively charged radicals such as: $-SO_3^-$; $-COO^-$; $-PO_3^{--}$; $-HPO_2^-$; $-AsO_3^{--}$; and $-SeO_3^-$. Vinyl addition polymers and condensation polymers are well suited for use as ion exchange membrane.

The gas electrode 103 (FIGS. 1–3) is an electrically conductive, hydraulically permeable member having a plurality of interconnecting passageways traversing the member. The passageways have diameters sufficiently large to allow gases and liquids to enter and flow at least partially through the electrode. Such electrodes are usually from about 0.01 to about 0.10 inch thick and are most commonly from about 0.03 to about 0.04 inch thick. The electrode must be constructed of a material which is thermally and chemically suitable to the conditions present in a cell. Materials such as nickel, iron, steel, titanium, carbon particles or carbon particles bonded together with a plastic- or wax-like material have been found to be suitable for most electrochemical processes. Other suitable gas electrodes and methods for preparing them are taught in the following patents: U.S. Pat. No. 4,179,350, Catalytically Innate Electrodes, G. A. Deborski, Dec. 18, 1979; U.S. Pat. No. 4,187,350, J. A. McIntyre and R. F. Phillips, Feb. 5, 1980; U.S. Pat. No. 4,197,367, G. A. Deborski, Apr. 8, 1980; U.S. Pat. No. 4,213,833, J. D. Lefevre, July 22, 1980; U.S. Pat. No. 4,256,545, G. A. Deborski, Mar. 17, 1981; U.S. Pat. No. 4,260,469, J. A. McIntyre, R. F. Phillips and J. D. Lefevre, Apr. 7, 1981; and U.S. Pat. No. 4,269,691, G. A. Deborski, May 16, 1981. The teachings of these patents are herein incorporated by reference.

The self-draining member 102 (FIGS. 1–3) is positioned between the separator and the gas electrode. A plurality of interconnecting passageways traverse the member. These passageways have average diameters sufficiently large to make the member self-draining, i.e., the effects of gravity are greater than the effects of capillary pressure on a liquid present within the passageways. The actual required diameter depends on the surface tension, the viscosity and other physical characteristics of a liquid present within the passageways of the member 102. In most commonly encountered processes, the passageways should have minimum diameters of about 30 to 50 microns. The maximum diameter is not critical but it should not be so large as to not be supportive.

The thickness of the self-draining member should be minimized. If the member is too thick, the distance between the electrodes is increased and the resistance losses of the cell become excessive. Conversely, if the member is too thin, there is insufficient space to allow nonvolatile products to drain into the fluid outlet. Suitable thicknesses for the self-draining member have been found to be from about 0.03 inch to about 0.25 inch. However, for most applications, thicknesses of from about 0.06 inch to about 0.20 inch have been determined to be most suitable.

The self-draining member 102 must be electrically non-conductive, otherwise, undesirable electrochemical reactions will occur in the self-draining member where no gas is present. Suitable non-conductive materials include glass, plastic and various ceramics. The components of the member may be individual particles supported by a screen-type or other suitable support, or they may be particles sintered or bonded together.

It is not critical that an entire face of the self-draining member 102 be contiguous with an entire of the separator 101, nor is it critical that an entire face of the member be contiguous with an entire face of the electrode. There should, however, be sufficient contact to allow an operable amount of liquid to pass from the separator 101 to the electrode 103.

Methods for constructing the electrode are taught in the above-described patents (which have been incorporated by reference). Following those teachings, the electrode is either a rigid, self-supporting member or an accumulation of loose particles held rigidly together by a screen-like container.

The self-draining member may be assembled by bonding or fusing together a plurality of individual particles. Optionally, the member may be composed of loose particles held rigidly together by a screen-like container. The assembled, self-draining member is then pressed against the electrode and secured (e.g. bolted, bonded, sintered or fused) thereto. The so-formed combination with then be self-supporting and substantially rigid.

The separator is then placed against the self-draining member and secured (e.g. bolted or bonded) thereto. Optionally, the member may be held in place by the hydraulic pressure of a liquid electrolyte present in an operating cell.

A particularly convenient method for applying an asbestos diaphragm to a self-draining member is by drawing or aspirating a substantially even layer of asbestos fibers onto the member to a desired thickness. This may be done using a tank containing an asbestos slurry. One face of the self-draining member (whether attached to the electrode or not) is positioned to contact the slurry and a vacuum is then applied to the opposite face of the member. The vacuum draws the fibrous asbestos onto the member. A fine mesh screen or cloth may optionally be placed on the surface of the self-draining member contacting the slurry to enhance the deposition of asbestos onto the member as the slurry is pulled therethrough. Another convenient method for forming an asbestos diaphragm is by remotely forming the fibers into a paper-like web or non-woven mat. It is then securely mounted on the self-draining member using adhesives, mechanical fasteners, or other desired means. Another method which may be used is by spraying or painting an asbestos slurry onto the support member and allowing it to dry.

Preparation of ion exchange membrane materials is described in many U.S. patents including U.S. Pat. No. 3,282,875. These ion exchange membranes are available under the trade designation "Nafion" from E. I. duPont de Nemours and Company Inc. They, as well as other ion exchange membranes, are well-suited for the indicated purpose.

After assembly, the separator-gas electrode combination has a thickness of from about 0.1 to about 0.6 inch (about 0.03 to about 0.25 inch for the self-draining member; about 0.06 to about 0.25 inch for the separator; and about 0.01 to about 0.1 inch for the electrode).

Referring now to FIG. 3, the separator-gas electrode combination is illustrated in an electrochemical cell 300. For the purposes of illustration, it is shown as a separator-cathode combination. However, it could also be used as a separator-anode combination.

In operation, a liquid electrolyte is flowed into anode chamber 310 through conduit 311. The electrolyte is then flowed through the separator 101, through the self-draining member 102 and into at least a portion of the passageways of the gas electrode 103. A gas is flowed into the gas chamber 105 through inlet port 104. Excess gas and gaseous products produced at the electrode are removed through gas outlet port 106. Power is supplied to the anode 309 through lead 313 and to the cathode 103 through lead 315. Electrochemical reactions occur between the gas and the liquid within the passageways of the cathode 103 and anodic reactions occur at anode 309. Gaseous products produced in the passageways of the gas cathode 103 diffuse into the gas chamber 105 where they are removed through outlet port 106. Nonvolatile products produced within the passageways of the gas electrode 103 diffuse into the passageways of the self-draining member where they blend with reactants and flow by gravity into a lower portion of the self-draining member. They are then removed through outlet port 107. Gaseous products produced at the anode 309 are removed through conduit 312, i.e., excess electrolyte and nonvolatile products are removed from the anode compartment 310 through conduit 316.

If the separator is an ion exchange membrane, only ions will pass through the separator 101 into the self-draining member 102. In this case, it is necessary to flow a liquid into the self-draining member or into the electrode to dissolve the ions. Water is commonly used for this purpose.

The electrochemical cell has been found to be particularly useful for the production of chlorine and caustic from a sodium chloride brine solution. The brine solution is fed into the anode compartment 310 through conduit 311. A portion of the brine is flowed through the separator 101, through the self-draining member 102, and into the passageways of the gas electrode 103. An oxygen-containing gas is flowed into the gas electrode 103 from gas chamber 105. Electrical energy, at a current density of about 0.5 to about 3.0 amps per square inch at a voltage of about 1.8 to about 2.9, is applied to the anode 309 and to the cathode 103 to cause reactions to occur between the oxygen gas, the NaCl and the $H_2O$. Chlorine gas is produced at the anode and removed through conduit 312. Sodium hydroxide produced at the cathode 103 mixes with the aqueous NaCl solution in the electrode and diffuses out of the passageways of the cathode 103 and into the passageways of the self-draining member 102. The mixture then flows by gravity to a lower portion of the self-draining member 102 and is removed through outlet port 107. The NaOH concentration of the product is controlled by increasing or decreasing the rate at which material is removed from the self-draining member. Rapid removal rates yield generally weaker NaOH solutions, while slow removal rates yield generally stronger NaOH solutions. Passage of electrical current through the electrolyte frequently raises the operating temperature of the electrolyte to 80°–99° C.

What is claimed is:

1. A separator-gas electrode combination comprising:
   (a) a separator adapted to permit the flow of fluids or ions therethrough and having at least a first and a second face; and
   (b) a hydraulically permeable gas electrode adapted to permit a liquid and gas to enter and exit the electrode and having at least a first and second face; and
   (c) a gas chamber contiguous to at least a portion of the second face of the gas electrode; and
   (d) a means to introduce an oxygen-containing gas into said gas chamber; and
   (e) an electrically non-conductive self-draining member having a fluid outlet opening external to the separator-gas electrode combination and at least two faces, at least a portion of a first face being contiguous to at least a portion of one face of the separator, and at least a portion of a second face being contiguous to at least a portion of the first face of the gas electrode; said member having a plurality of interconnected passageways in fluid-transferring communication with the separator, the gas electrode and the fluid outlet and providing the major conduit therebetween.

2. The combination of claim 1 wherein the separator is a hydraulically permeable diaphragm.

3. The combination of claim 2 wherein the diaphragm is asbestos fibers.

4. The combination of claim 1 wherein the separator is a substantially hydraulically impermeable ion exchange membrane.

5. The combination of claim 4 wherein the membrane is a cation selective membrane.

6. The combination of claim 3 wherein the diaphragm is from about 0.05 inch to about 0.25 inch thick.

7. The combination of claim 1 wherein the combination is substantially planar.

8. The combination of claim 1 wherein the separator, the gas electrode, and the self-draining member are cylindrical in shape.

9. The combination of claim 1 wherein the plurality of interconnected passageways of the self-draining member have an average diameter of at least about 30 microns.

10. The combination of claim 1 wherein the passageways of the self-draining member have an average diameter of at least about 50 microns.

11. The combination of claim 1 wherein the gas electrode is from about 0.01 inch to about 0.1 inch thick.

12. The combination of claim 1 wherein the self-draining member is from about 0.03 inch to about 0.25 inch thick.

13. The combination of claim 1 wherein the overall thickness of the combination is from about 0.1 inch to about 0.6 inch.

* * * * *